United States Patent Office 2,816,831
Patented Dec. 17, 1957

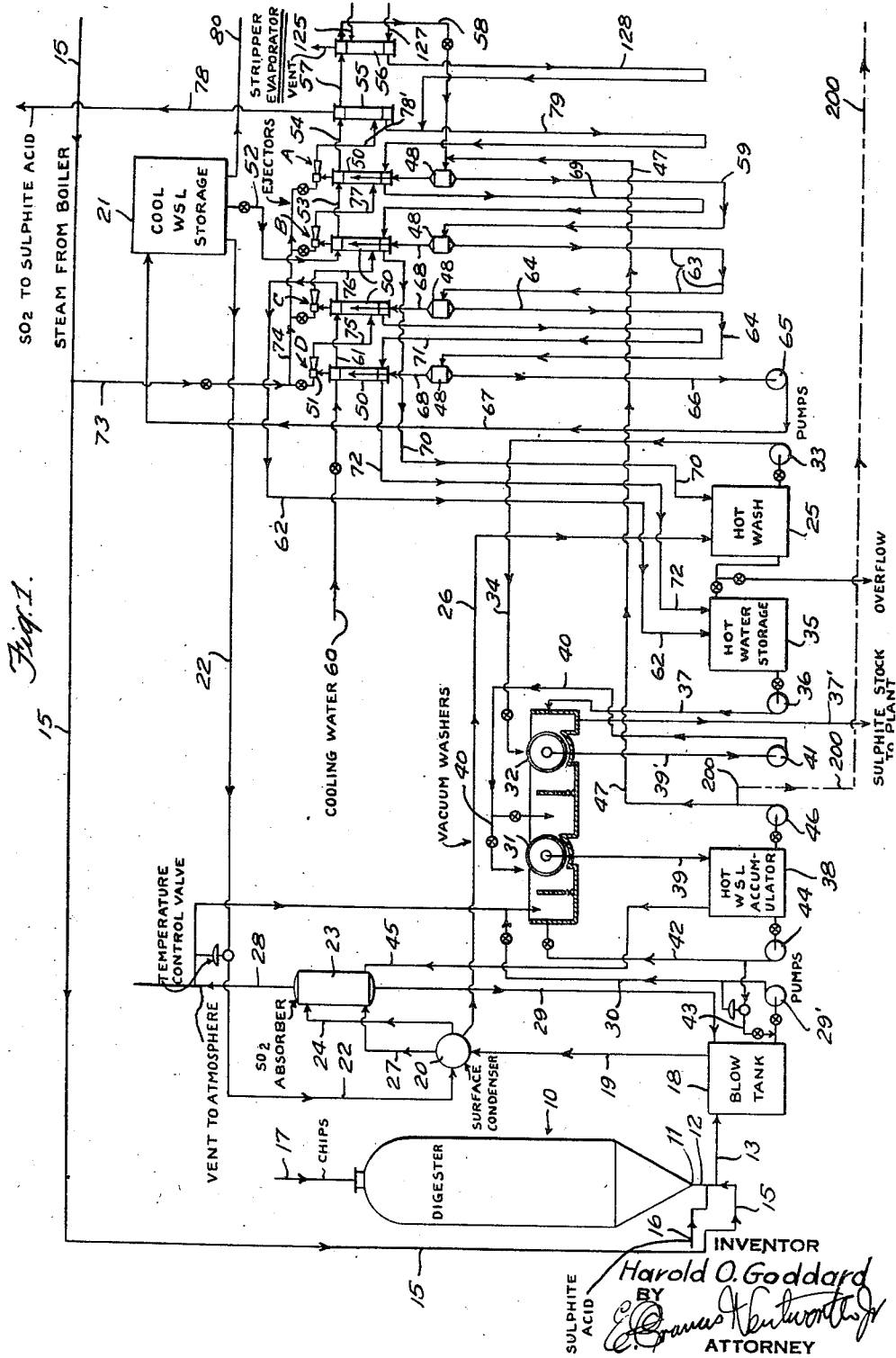

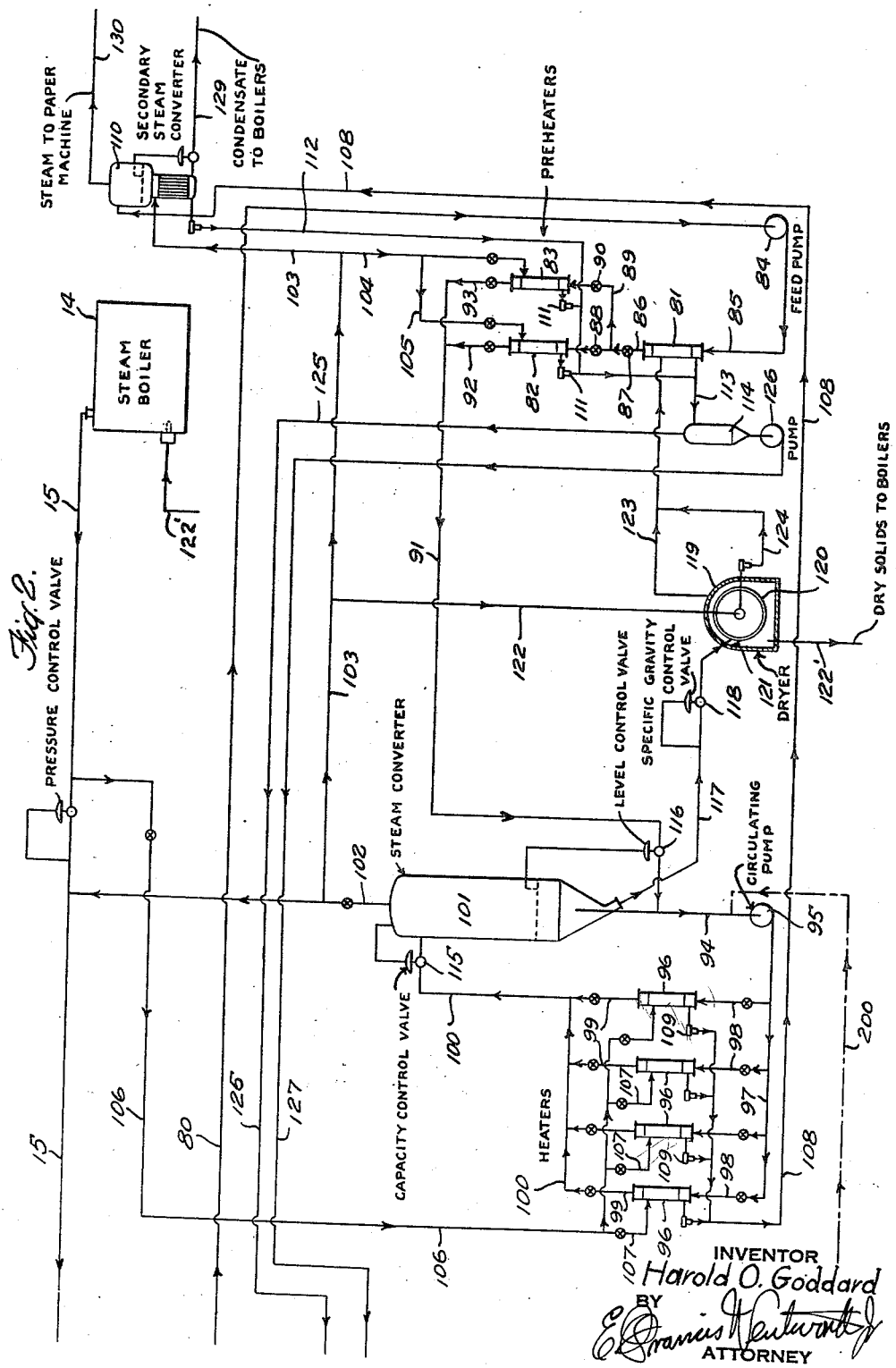

2,816,831

PROCESS FOR PRODUCING AND CONCENTRATING RESIDUAL WASTE SULPHITE LIQUOR

Harold Oliver Goddard, St. Catharines, Ontario, Canada

Original application April 2, 1949, Serial No. 85,116, now Patent No. 2,676,883, dated April 27, 1954. Divided and this application March 25, 1954, Serial No. 418,723

4 Claims. (Cl. 92—2)

This invention relates to the recovery of useful products from waste sulphite liquor discharged by sulphite pulp plants.

This application is a division of application Serial Number 85,116, filed April 2, 1949, now Patent No. 2,676,883.

Heretofore, numerous products have been recovered from waste sulphite liquor. For example, the sugars therein have been recovered and used in the production of alcohol. Sulphur dioxide gas and sulphites have been recovered from said liquor. Waste sulphite liquor has also been concentrated or dried and the liquor in concentrated or dried form has been burned. While prior recovery methods of which I am aware have been to some degree successful in accomplishing their purposes, they have not been economic in their functioning nor have they been trouble-free in their operation.

The present invention provides a method of and apparatus for the recovery of useful products from waste sulphite liquor in which said products are economically recovered.

A method of and apparatus for producing a finely divided solid, for example, a fuel useful in a steam generator.

In accordance with the present invention, steam for use in the operation of a sulphite pulp plant is generated to a pressure higher than that required for the operation of the digesters, paper machine dryers, or other steam consumers in said plant, and at the higher pressure is used to concentrate the waste sulphite liquor into a form which is usable as a fuel in a steam generator. The solids from the concentrated and waste sulphite liquor, which contain approximately 8,000 B. t. u. per pound of dry solids, are produced, in accordance with the present invention, in a finely divided state and may readily be substituted for pulverized coal to fire said steam generator. The steam, after use in concentrating and drying the waste sulphite liquor, is then used, at its reduced pressure, to operate the above-mentioned steam consumers of the sulphite pulp plant. By borrowing steam between the plant steam generator and the plant steam consumers, the waste sulphite liquor conversion is accomplished with a minimum of steam loss in evaporation.

The invention will be understood from the following description when considered in connection with the accompanying drawings forming a part thereof and in which:

Fig. 1 is a diagrammatic view of an arrangement of a portion of the apparatus of the present invention; and Fig. 2 is a continuation of the diagrammatic view shown in Fig. 1.

Like characters of reference refer to the same or to similar parts throughout the views.

Referring to Fig. 1 of the drawings, the reference numeral 10 designates a digester of conventional construction which discharges through the bottom 11 thereof into a pipe 12 communicating with a discharge conduit 13. Steam for heating the contents of the digester to cooking temperature is conducted thereto from a steam generator shown diagrammatically at 14 (Fig. 2) through steam line 15 and pipe 12 while sulphite acid used in the digester is introduced at the bottom thereof through pipes 16 and 12. Chips are conducted into the top of the digester through a conduit 17.

As is usual in the operation of such a digester, at the start of each batch the digester 10 is loaded with wood chips conducted thereinto through conduit 17 and filled with sulphite acid which enters the digester through pipes 16 and 12. The charge of wood chips and sulphite acid is then cooked by steam conducted to the digester through lines 15 and 12. Upon completion of the cooking operation, the contents are discharged from digester 10 into blow tank 18 through line 12 and discharge conduit 13.

Gases (SO$_2$) flashed off during blow-down are vented from blow tank or pit 18 through gas line 19 into a surface condenser 20 wherein vapor in the gas is condensed by flowing in contact with surface cooled by cool waste sulphite liquor collected in a storage tank 21 during operation of the present invention as hereinafter described. The cool waste sulphite liquor is conducted to condenser 20 through line 22 and, after condensing vapor in the SO$_2$ gas and becoming heated by passing in heat exchange relationship with said gas, is passed to the upper part of an absorber 23 through conduit 24. Condensate from condenser 20 flows to hot wash container 25 through line 26 while the SO$_2$ gas, after the vapor has been removed therefrom, is passed to the lower part of absorber 23 through gas line 27. Gases flowing into absorber 23 through gas line 27 are absorbed by waste sulphite liquor flowing into the absorber through conduit 24. Any unabsorbed gases are vented to the atmosphere from the absorber through outlet 28. The waste sulphite liquor, after absorbing SO$_2$ in the absorber, flows to blow tank 18 through conduit 29 where it is mixed with the blown-down pulp from digester 10 to reduce the pulp consistency so that the same may be pumped from said tank. The temperature of the pulp and liquor in blow-tank 18 would normally be approximately 185° F. at which temperature the SO$_2$ therein would remain in solution.

The solution of pulp and waste sulphite liquor is pumped from blow tank 18 by pump 29' through line 30 into suitable pulp washing apparatus such as rotary vacuum filters 31 and 32 arranged in series. The washing apparatus would normally be designed to wash approximately 90% or more of the waste sulphite liquor from the pulp with a dilution of less than one pound of water per pound of pulp and at the same time discharge liquor at the temperature at which it was received, that is, approximately 185° F. The mixture entering the washing apparatus through conduit 30 is washed with a mixture of condensate from condenser 20, which is discharged into hot wash container 25 through conduit 26, and hot water received from the evaporating apparatus hereinafter described. The condensate and hot water mixture is pumped by pump 33 from container 25 through line 34 into the washing apparatus. Also hot water from water storage 35, which water is received from evaporating apparatus hereinafter described, is pumped into the washing apparatus by pump 36 through line 37. Washed pulp is removed from the washing apparatus through outlet conduit 37' while hot waste sulphite liquor is passed from washer 31 into hot waste sulphite accumulator 38 through line 39. Waste sulphite liquor from washer 32 is recirculated to the washer through recirculating lines 39' and 40 by recirculating pump 41. To maintain the proper pulp consistency in the washers and also in blow tank 18, a portion of the hot waste sulphite liquor from accumulator 38 is passed to the washers through line 42 and to the blow tank through lines 42 and 43 by circulating pump 44. SO$_2$ gas from accumulator 38 is conducted to absorber 23 through gas line 45 so that said gas will be scrubbed along with the gas entering absorber 23 through line 27.

Waste sulphite liquor from accumulator 38 is pumped by pump 46 through waste sulphite liquor conduit 47 to stripper evaporator apparatus where said waste sulphite liquor is evaporated, cooled, condensed, concentrated and stripped of $SO_2$ gas. Each stripper evaporator comprises a flash chamber and a condenser which are maintained under vacuum by means of a steam ejector.

The stripper evaporator, as shown in Fig. 1, consists of four stages of evaporation indicated at A, B, C, and D. Each stage comprises a flash chamber 48 and a condenser 50 both of which are maintained under vacuum by a steam ejector 51. Cooling medium for condensers 50 of stages A and B is provided from the cool waste sulphite liquor storage tank 21 and flows through said condensers serially, passing into condenser 50 of stage B in line 52. After flowing through condenser 50 of stage B, the waste sulphite liquor flows to condenser 50 of stage A by way of line 53 thereafter passing through said condenser and outwardly therefrom into pipe 54. Condensers 50 of stages D and C are supplied with a water cooling medium which enters condenser 50 of stage D through cool water conduit 60 and passes through said condensers serially, flowing from condenser 50 of stage D to condenser 50 of stage C through line 61 and from the condenser of stage C into hot water storage 35 through conduit 62. Hot water for use in the pulp washing apparatus, hereinbefore described, is thusly provided.

From pipe 54, the waste sulphite liquor is passed serially through condensers 55 and 56, said condensers communicating with one another through pipe 57. Waste sulphite liquor from condenser 56 flows to flash chamber 48 of stage A through conduit 58 while waste sulphite liquor from the hot waste sulphite liquor accumulator 38 flowing through conduit 47 also passes to said flash chamber. The hot waste sulphite liquor from accumulator 38 and from the condensers 50, 55, and 56 is cooled and concentrated by successively flashing it through flash chambers 48 of stages A, B, C, and D, the liquid from chamber 48 of stage A flowing therefrom to the flash chamber of stage B through line 59 in which chamber it is flashed and passed to chamber 48 of stage C through conduit 63. In the flash chamber of stage D, the liquor flowing thereto through line 64 is flashed and the remaining liquid flows to pump 65 through conduit 66 and is pumped to the cool water sulphite liquor tank 21 through line 67.

The temperature of the waste sulphite liquor flowing through conduit 47 to flash chamber 48 of stage A would be at substantially 185° F. while the waste sulphite liquor flowing from condensers 50, 55 and 56 into flash chamber 48 through conduit 58 enters said flash chamber at approximately 160° F. The temperature of the waste sulphite liquor is progressively reduced by the flash chambers 48 of stages A, B, C, and D so that the temperature of the liquor leaving flash chamber 48 of stage D through conduit 66 and passing to the cool waste sulphite liquor tank 21 through line 67 is at substantially 100° F.

The vapor flashed off in flash chambers 48 flows to the condenser 50 of the stage with which the chamber is associated through a line 68 thereafter to be condensed in said condensers 50. The condensate from condenser 50 of stage A is passed to condenser 50 of stage B through conduit 69 wherein it is flashed and the condensate from condenser 50 of stage B flows to hot wash container 25 through line 70. Condensate produced in condenser 50 of stage C is passed to condenser 50 of stage D through conduit 71 and is flashed in the condenser of stage D. The condensate forming in condenser 50 of stage D is passed to hot water storage 35 through line 72. In this manner, the heat contained in the condensate is recovered and the $SO_2$ gas removed therefrom.

Steam line 15 is connected to each of the ejectors 51 of stages A, B, C, and D through steam conduits 73 and 74, steam conduit 73 being in communication with steam line 15 while conduit 74 is in communication with conduit 73. Ejector 51 of stage D receives steam from conduit 73 while the ejector of stages C, B, and A respectively, receive steam from conduit 74. The vapor removed from condenser 50 of stage D by ejector 51 flows through line 75 to condenser 50 of stage C wherein the condensibles are condensed and from which the vapor is withdrawn by ejector 51 for stage C. The vapors removed from the condenser for stage C by the ejector therefor are passed to condenser 50 of stage B wherein condensibles are condensed therefrom. Vapor withdrawn by ejector 51 of stage B flows to condenser 50 of stage A through line 77 and the condensible portion thereof is condensed in the condenser of stage A. The ejector of stage A discharges into condenser 55 through line 78'. The noncondensibles from condenser 55, which comprises $SO_2$ gas, is conducted through conduit 78 to the sulphite acid container for the plant, not shown, while condensate from condenser 55 flows through line 79 to condenser 50 of stage A wherein it is flashed. In the present invention, the steam ejectors 51 of stages A, B, C, and D serve a double purpose in that they maintain a vacuum on the flash chambers 48 and condensers 50 of the stage with which they are associated and also build the pressure of $SO_2$ gas back to a desired amount, for example, one pound per square inch gage. The ejector steam is condensed from the $SO_2$ gas in the various condensers so that a water saturated $SO_2$ gas is released from the stripper evaporator through conduit 78. It will be noted that in accordance with the method and apparatus of the present invention, the waste sulphite liquor flowing to storage tank 21 through line 67 is concentrated without the use of auxiliary heat or excessive heating surfaces and that the $SO_2$ gas is removed therefrom and reclaimed.

In accordance with the present invention, the waste sulphite liquor in storage 21 is further concentrated and also dried. As shown in Fig. 2 of the drawings, waste sulphite liquor from storage tank 21 of Fig. 1 is conducted through a conduit 80 to preheating apparatus comprising, as shown, three preheaters 81, 82, and 83. The waste sulphite liquor in line 80 passes to a feed pump 84 which pumps the liquor into preheater 81 through line 85. From preheater 81, the liquor flows either to preheater 82 or to preheater 83 passing to preheater 82 through line 86 which is valved at 87 and 88 or to preheater 83 through line 86 and line 89 which is valved at 90. Heated waste sulphite liquor from preheater 82 passes into conduit 91 through valved line 92 while heated liquor from preheaters 83 flows into conduit 91 through valved line 93. From conduit 91, the preheater waste sulphite liquor passes into conduit 94 thence through a circulating pump 95, which places the liquor under pressure into a plurality of heaters 96 through a feed line 97 in which heaters the liquor is heated under pressure. Each of the heaters 96 receive feed from line 97 through valved connections 98 and discharge the heater waste sulphite liquor through valved outlet connections 99 into an outlet conduit 100. Heater waste sulphite liquor from the conduit 100 is passed to a steam converter 101. Converter 101 is under such lower pressure than the heaters that the waste sulphite liquor is flashed into steam some of which steam is condensed and the remainder of which is removed from the converter in a vaporous state.

As shown, steam from the converter 101 flows outwardly thereof and into steam line 15 through conduit 102. A portion of the steam in line 102 is passed through conduits 103 and 104 to preheaters 82 and 83. Steam enters preheater 83 through line 104 which line is valued adjacent the preheater while steam flows to preheater 82 through conduit 104 through connection 105 which connection is valved. It will be noted that the various steam connections and waste sulphite liquor connections to preheaters 82 and 83 are so valved that one of the heaters may be disconnected from the circuit and cleaned without interfering with the functioning of the other preheaters. Heaters 96 receive steam for the heating of the waste sulphite liquor flowing thereinto through lines 97 and 98 from a steam conduit 106 which receives steam from steam line 15, the steam from conduit 106 flowing into said preheaters through valved connections 107. Condensate from heaters 96 passes into a condensate line 108 through valved connections 109, said condensate thereafter passing to a secondary steam converter 110 which is under such pressure that part of the condensate flashes into steam. Steam from converter 101 also flows into steam converter 110 through lines 102 and 103 and, by heat interchange in secondary converter 110, flashes additional condensate from heaters 96 entering said converter through line 108 into steam. The remaining condensate is returned from converter 110 through line 129 to steam generator 14. Condensate from the preheaters 82, and 83 flow through valved connections 111 into condensate line 112 which is connected to receive condensate from secondary steam converter 110 and connects with a conduit 113 conducting condensate from preheater 81 to a flash chamber 114.

In operation, the waste sulphite liquor flowing into feed pump 84 through conduit 80 is brought up to the operating pressure of steam converter 101 and passed into preheater 81 through line 85. From preheater 81, the waste sulphite liquor is conducted to either or both of the preheaters 82 or 83, and after heating therein is conducted to the heaters 96 through either or both lines 92 and 93 into line 91 and from line 91 through conduit 94, circulating pump 95, and line 97. From line 97, the preheated waste sulphite liquor is conducted to any one or all of the heaters 96 through connections 98. After heating in the heaters 96, the waste sulphite liquor is passed into lines 100 through outlet connections 99 thence into the steam converter 101. It will be noted, that the inlet connections 98 and the outlet connections 99 are so valved that any one or all of the heaters may be used and various heaters may be removed from the line for cleaning as desired. Preheating in the preheaters 81, 82 and 83 and the heating in heaters 96 is done under pressure to avoid steaming in the waste sulphite liquor so as to reduce the scaling on the preheater and heater surfaces. As shown, the liquid level in steam converter 101 is controlled by capacity control valve 116 in line 91 while the pressure in said steam converter is controlled by pressure control valve 115 in line 100.

After removal of vapor therefrom in converter 101, a portion of the waste sulphite liquor of the desired concentration is withdrawn from the bottom of steam converter 101 through outlet conduit 117 controlled by a specific gravity control valve 118 which controls the specific gravity of liquor flowing through outlet line 117. Another portion of the waste sulphite liquor of the desired concentration flows from the steam converter 101 through line 94, in which it is diluted by waste sulphite liquor entering said line through conduit 91, and is thereafter pumped by circulating pump 95 into the heaters 96. The flashing of the waste sulphite liquor in steam converter 101 provides calcium sulphate crystals which have surfaces sufficiently large that the scaling of heaters 96 by said liquor passing thereinto through lines 94, 97 and 98 will be reduced. These crystals will have a gentle scouring action to remove any scale adhering to the tubes and will prevent super-saturation of calcium sulphate in the heater tubes by offering a surface on which the calcium sulphate will tend to first crystallize and will prevent super-saturation of calcium sulphate in the steam converter 101.

Concentrated waste sulphite liquor flowing from steam converter 101 through line 117 is passed to a dryer 119. As shown in Fig. 2, the dryer 119 comprises a rotating drum 120 across the face of which an even film of concentrated waste sulphite liquor from line 117 is distributed by distributor 121. Steam from steam converter 101 flowing through lines 102 and 103 pass into the drum 120 so as to heat the outer periphery thereof through line 122. The heat of the steam is such that the film of concentrated waste sulphite liquor will be dried into solid form in one revolution of the drum and the dry solids will thereafter be removed from said surface by a scrapper or other desirable means. The dried solids which comprises finely divided dry crystals somewhat similar to pulverizer coal are removed from the dryer by a screw conveyer or rotary air-lock, not shown, and passed into line 122', which, as shown, is connected to burners of steam generator 14. The dryer 119 is so enclosed that the vapor released from the waste sulphite liquor in drying may be conducted through a pipe 123 to preheater 81 and thereby used to preheat waste sulphite liquor flowing into said heater. The condensate from the dryer 119 passes into pipe 123 through line 124, and together with the condensate from heater 81, flows through line 113 into flash chamber 114. The steam from flash chamber 114 flows into condenser 56 (Fig. 1) through conduit 125 while the condensate from said flash chamber is pumped by pump 126 through line 127 into condenser 56. The condensate from condenser 56 flows from condensate line 128 into line 79 which, as heretofore described, extends between condenser 55 and condenser 50 of stage A.

As shown in Fig. 2, steam from steam converter 101 passes through lines 102 and 103 into secondary steam converter 110 from which converter condensate passes into preheaters 82 and 83 through line 112 as hereinbefore described. Condensate from converter 110 also flows to the steam generator 14 through conduit 129. Steam from secondary converter 110 is passed to steam consumers such as paper machines through steam conduit 130.

It will be apparent that various modifications may be made in the form of the apparatus herein disclosed and in the steps of the process herein described without departing from the spirit of the invention which is not to be limited excepting by the scope of the appended claims.

What is claimed is:

1. A process for producing residual waste sulphite liquor from a mixture of fibrous material and waste sulphite cooking liquor and concentrating and drying the residual waste sulphite liquor, which process comprises intermittently discharging a mixture of sulphite cooking liquor and fibrous material from a digesting zone into a vessel where gases are flashed from said discharged mixture, conducting the gases to an absorbing zone, flowing concentrated waste sulphite liquor into the absorbing zone for absorbing said gases, flowing the concentrated waste sulphite liquor and absorbed gases from the absorbing zone into said vessel and into admixture with the discharged mixture of sulphite cooking liquor and fibrous material to dilute the latter mixture, passing the diluted mixture of cooking liquor and fibrous material to a washing zone to separate the fibrous material and sulphite cooking liquor and thereby obtaining a residual waste sulphite liquor, flowing the residual waste sulphite liquor successively through a plurality of evaporating zones to successively concentrate and reduce the temperature of the waste sulphite liquor and produce vapor in each of said evaporating zones, passing the concentrate from the last evaporating zone, condensing vapor from each evaporating zone in a condensing zone communicating therewith by passing it in heat exchange relationship in some of said last-mentioned condensing zones with a portion of said concentrated waste sulphite liquor passed from the last evaporating zone of said successive zones and in heat exchange relationship with water in the other condensing zones associated with the evaporating zones, flowing another portion of the concentrated waste sulphite liquor to said absorbing zone for use in absorbing gases flashed from the discharged mixture of fibrous material and sulphite cooking liquor, feeding another portion of the concentrated waste sulphite liquor from said last evaporating zone into a heating zone to heat the concentrated waste sulphite liquor under pressure to prevent steaming of the liquor, concentrating said heated liquor by passing the heated liquor into a zone of lower pressure than said heating zone to flash vapor from the liquor, and drying said further concentrated liquor into solid form.

2. A process for producing residual waste sulphite liquor from a mixture of fibrous material and waste sulphite liquor and concentrating and drying the residual waste sulphite liquor, which process comprises intermittently discharging a mixture of sulphite cooking liquor and fibrous material from a digesting zone into a vessel where gases are flashed from said discharged mixture, passing the flashed gases to a heat exchange zone into indirect heat exchange relationship with a cooling medium to condense a portion of said gases therein, flowing the uncondensed gases from the heat exchange zone into admixture with a portion of concentrated waste sulphite liquor in an absorbing zone to thereby absorb the uncondensed gases in the concentrated waste sulphite liquor, flowing the concentrated waste sulphite liquor and absorbed gases from the absorbing zone into said vessel and into admixture with the discharged mixture of sulphite cooking liquor and fibrous material to dilute the latter mixture, passing the diluted mixture of cooking liquor and fibrous material to a washing zone for separation of the fibrous material from the sulphite cooking liquor and thereby obtaining a residual waste sulphite liquor, flowing the residual waste sulphite liquor successively through a plurality of evaporating zones to successively concentrate and reduce the temperature of the waste sulphite liquor and produce vapor in each of said evaporating zones, passing concentrate from the last evaporating zone, condensing vapor from each evaporating zone in a condensing zone associated therewith by flowing it in heat exchange relationship in some of said last-mentioned condensing zones with a portion of said concentrated waste sulphite liquor passed from the last evaporating zone of successive zones and in heat exchange relationship with water in other of the condensing zones associated with the evaporating zones, passing condensate from the first-mentioned condensing zone and water from the condensing zones associated with the evaporating zones into the washing zone for use as a washing medium therein, flowing another portion of the concentrated waste sulphite liquor discharged from the last evaporating zone to the absorbing zone to absorb the uncondensed gases released from the discharged mixture of sulphite cooking liquor and fibrous material, passing concentrate used for condensing vapor from said evaporating zones into the first of said plurality of evaporating zones, evaporating said last-mentioned concentrate successively in the plurality of evaporating zones, feeding another portion of the concentrated waste sulphite liquor from said last evaporating zone into a heating zone to heat the liquor under a predetermined pressure to prevent steaming of the liquor, further concentrating said heated liquor by passing the heated liquor into a zone of lower pressure than said heating zone to flash vapor from the heated liquor, and drying said further concentrated liquor into solid form.

3. A process for producing residual waste sulphite liquor from a mixture of fibrous material and waste sulphite cooking liquor and concentrating and drying the residual waste sulphite liquor which comprises intermittently discharging a mixture of sulphite cooking liquor and fibrous material from a digesting zone into a vessel where gases and vapor are flashed from said discharged mixture, passing the gases and vapors to a heat exchange zone into indirect heat exchange relationship with a portion of concentrated waste sulphite liquor to condense the vapor therein, flowing the vapor-free gases and the concentrated waste sulphite liquor from the heat exchange zone into admixture with each other in an absorbing zone to thereby absorb vapor-free gases in the concentrated waste sulphite liquor, flowing the concentrated waste sulphite liquor and absorbed gases from the absorbing zone into said vessel and into admixture with the discharged mixture of sulphite cooking liquor and fibrous material to dilute the latter mixture, passing the diluted mixture of cooking liquor and fibrous material to a washing zone to separate the fibrous material from sulphite cooking liquor and thereby obtain a residual waste sulphite liquor, flowing the residual waste sulphite liquor successively through a plurality of evaporating zones to successively concentrate and reduce the temperature of the waste sulphite liquor and produce vapor in each of said evaporating zones, passing concentrate from the last evaporating zone, condensing vapor from each evaporating zone in a condensing zone associated therewith by flowing it in heat exchange relationship in some of said last-mentioned condensing zones with a portion of said concentrated waste sulphite liquor passed from the last evaporating zone of successive zones and in heat exchange relationship with water in other of the condensing zones associated with the evaporating zones, passing condensate from the first-mentioned condensing zone and water from the condensing zone associated with the evaporating zones into the washing zone for use as a washing medium therein, flowing another portion of the concentrated waste sulphite liquor discharged from the last evaporating zone of successive zones to said heat exchange zone and said absorbing zone for respectively condensing the vapor from a mixture of vapor and gases flashed from the mixture of fibrous material and waste sulphite cooking liquor and absorbing the vapor-free gases in the absorbing zone, passing concentrate used for condensing vapor from said evaporating zones into the first of said plurality of evaporating zones, evaporating said last-mentioned concentrate successively in the plurality of evaporating zones, feeding another portion of the concentrated waste sulphite liquor from the last evaporating zone into a heating zone to heat the liquor under a predetermined pressure to prevent steaming of the liquor, further concentrating said heated liquor by passing the liquor into a zone of lower pressure than said heating zone to flash vapor from said liquor, and drying said further concentrated liquor into solid form.

4. A process for producing residual waste sulphite liquor from a mixture of fibrous material and waste sulphite cooking liquor and concentrating and drying the residual waste sulphite liquor, the process comprising intermittently discharging a mixture of sulphite cooking liquor and fibrous material from a digesting zone into a vessel where gases and vapor are flashed from said discharged mixture, passing the gases and vapor to a heat exchange zone into indirect heat exchange relationship with a portion of concentrated waste sulphite liquor previously concentrated to condense the vapors therein, passing the condensed vapor to a separatnig zone for use as a washing medium in the latter zone, flowing the vapor-free gases and the concentrated waste sulphite liquor from the heat exchange zone into admixture with each other in an absorbing zone to thereby absorb the vapor-free gases in the concentrated waste sulphite liquor, flowing the concentrated waste sulphite liquor and absorbed gases from the absorbing zone into said vessel and into admixture with the discharged mixture of sulphite cooking liquor and fibrous material to dilute the latter mixture, passing the diluted mixture of cooking liquor and fibrous material to the washing zone for washing with the condensed vapor to separate the fibrous material from the sulphite cooking liquor and thereby obtaining a residual waste sulphite liquor, flowing the residual waste sulphite liquor successively through a plurality of evaporating zones to successively concentrate and reduce the temperature of the waste sulphite liquor and produce vapor in each of said evaporating zones, passing concentrate from the last evaporating zone, condensing vapor from each evaporating zone in a condensing zone associated therewith by flowing it in heat exchange relationship in some of said last-mentioned condensing zones with a portion of said concentrated waste sulphite liquor passed from the last evaporating zone of successive zones and in heat exchange relationship with water in other of the condensing zones, passing condensate from the first-mentioned condensing zone and water from the condensing zones associated with the evaporating zones into the washing zone for use as a washing medium with the condensed vapor therein, flowing another portion of the concentrated waste sulphite liquor discharged from the last evaporating zone of successive zones to said heat exchange zone and said absorbing zone for respectively condensing the vapor from a mixture of vapor and gases flashed from the mixture of fibrous material and waste sulphite cooking liquor and absorbing the vapor-free gases in the absorbing zone, passing the concentrated waste sulphite liquor used for condensing vapor from said evaporating zones into the first of said plurality of evaporating zones, evaporating said last-mentioned concentrate successively in the plurality of evaporating zones, feeding another portion of the concentrated waste sulphite liquor from the last evaporating zone into a heating zone to heat the liquor under a predetermined pressure to prevent steaming of the liquor, further concentrating said heated liquor by passing the liquor into a zone of lower pressure than said heating zone to flash vapor from said liquor, and drying the further concentrated liquor into solid form.

References Cited in the file of this patent

UNITED STATES PATENTS

| | | |
|---|---|---|
| 1,103,216 | Moore et al. | July 14, 1914 |
| 1,263,486 | Thorne | Apr. 23, 1918 |
| 1,308,184 | McAfee | July 1, 1919 |
| 1,469,958 | Richter | Oct. 9, 1923 |
| 1,864,619 | Richter | June 28, 1932 |
| 2,025,891 | Paulson | Dec. 31, 1935 |
| 2,108,567 | Scholler et al. | Feb. 15, 1938 |
| 2,197,059 | Seidel | Apr. 16, 1940 |
| 2,238,456 | Tomlinson | Apr. 15, 1941 |
| 2,352,304 | Young | June 27, 1944 |
| 2,385,955 | Tomlinson | Oct. 2, 1945 |
| 2,494,098 | Lockman | Jan. 10, 1950 |
| 2,574,193 | Savell | Nov. 6, 1951 |
| 2,676,883 | Goddard | Apr. 27, 1954 |